US010789784B2

United States Patent
Lin et al.

(10) Patent No.: US 10,789,784 B2
(45) Date of Patent: Sep. 29, 2020

(54) IMAGE DISPLAY METHOD, ELECTRONIC DEVICE, AND NON-TRANSITORY COMPUTER READABLE RECORDING MEDIUM FOR QUICKLY PROVIDING SIMULATED TWO-DIMENSIONAL HEAD PORTRAIT AS REFERENCE AFTER PLASTIC OPERATION

(71) Applicant: ASUSTeK COMPUTER INC., Taipei (TW)

(72) Inventors: Wei-Po Lin, Taipei (TW); Hao-Yuan Kuo, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/414,947

(22) Filed: May 17, 2019

(65) Prior Publication Data

US 2019/0362561 A1    Nov. 28, 2019

(30) Foreign Application Priority Data

May 23, 2018  (CN) .......................... 2018 1 0502084
Oct. 9, 2018  (CN) .......................... 2018 1 1171169

(51) Int. Cl.
  *G06T 19/20*   (2011.01)
  *G06T 15/04*   (2011.01)
  (Continued)

(52) U.S. Cl.
  CPC ............... *G06T 19/20* (2013.01); *G06T 7/73* (2017.01); *G06T 11/60* (2013.01); *G06T 15/04* (2013.01);
  (Continued)

(58) Field of Classification Search
  None
  See application file for complete search history.

(56) References Cited

U.S. PATENT DOCUMENTS 6,434,278 B1 * 8/2002 Hashimoto ............. G06T 17/00
                                                        345/583
6,549,200 B1 * 4/2003 Mortlock ................ G06T 15/04
                                                        345/419
(Continued)

FOREIGN PATENT DOCUMENTS

CN        104376599 A      2/2015
CN        104915981 A      9/2015
(Continued)

*Primary Examiner* — Hilina K Demeter
(74) *Attorney, Agent, or Firm* — McClure, Qualey & Rodack, LLP

(57) ABSTRACT

An image display method executes on an electronic device. The image display method establishes an original three-dimensional head portrait model with a plurality of first feature points according to frontal face information of a face, wherein the first feature points form a plurality of first grids on the original three-dimensional head portrait model, and the first feature points define a plurality of feature models on the original three-dimensional head portrait model; establishes a texture mapping figure according to a left face image, a right face image, and the first grids; obtains a replacement model according to a feature replacement instruction; replaces a selected feature model of the feature models with the replacement model to generate a simulated three-dimensional head portrait model; generates a simulated two-dimensional head portrait image according to the simulated three-dimensional head portrait model and the texture mapping figure; and displays the simulated two-dimensional head portrait image.

11 Claims, 17 Drawing Sheets

(51) Int. Cl.
   *G06T 17/20*   (2006.01)
   *G06T 11/60*   (2006.01)
   *G06T 7/73*    (2017.01)

(52) U.S. Cl.
   CPC .......... *G06T 17/20* (2013.01); *G06T 2200/08* (2013.01); *G06T 2207/30201* (2013.01); *G06T 2219/2016* (2013.01)

(56) References Cited

U.S. PATENT DOCUMENTS

| | | |
|---|---|---|
| 10,042,188 B2 | 8/2018 | Choukroun et al. |
| 2004/0201586 A1* | 10/2004 | Marschner .......... G06K 9/00268 345/426 |
| 2018/0089906 A1* | 3/2018 | Alkouh .................. G06T 17/00 |
| 2018/0308276 A1* | 10/2018 | Cohen .................... G06T 13/40 |
| 2019/0035149 A1* | 1/2019 | Chen .................. G06K 9/00255 |

FOREIGN PATENT DOCUMENTS

| | | |
|---|---|---|
| CN | 105913416 A | 8/2016 |
| CN | 106910247 A | 6/2017 |
| CN | 107408315 A | 11/2017 |

\* cited by examiner

IMAGE DISPLAY METHOD, ELECTRONIC DEVICE, AND NON-TRANSITORY COMPUTER READABLE RECORDING MEDIUM FOR QUICKLY PROVIDING SIMULATED TWO-DIMENSIONAL HEAD PORTRAIT AS REFERENCE AFTER PLASTIC OPERATION

CROSS-REFERENCE TO RELATED APPLICATION

This application claims the priority benefit of Chinese Application Serial No. 201810502084.7, filed on May 23, 2018 and Chinese Application Serial No. 201811171169.8, filed on Oct. 9, 2018. The entirety of the above-mentioned patent application is hereby incorporated by reference herein and made a part of specification.

BACKGROUND OF THE INVENTION

Field of the Invention

The disclosure relates to an image display method, an electronic device, and a non-transitory computer readable recording medium.

Description of the Related Art

In a current establishing technology of a three-dimensional head portrait model, a face of a user needs to be first scanned by using a scanner, to establish a three-dimensional head portrait model corresponding to the face of the user. Then, for a feature part to be adjusted, an expected three-dimensional head portrait model is obtained through a gradual adjustment by using a three-dimensional deformation mathematical formula.

However, a currently established three-dimensional head portrait model is a static model. The model only maintains an initial expression state of a face but does not simulate other expression states of the face. Therefore, a presented simulation level is insufficient, and more detailed information cannot be provided for the user for reference in plastic surgery application. In addition, a proper adjustment by using the three-dimensional deformation mathematical formula relies on determining experience of the skilled user. Even if the three-dimensional head portrait model that meets the expectations of the user is obtained through adjustment, too much time is required.

BRIEF SUMMARY OF THE INVENTION

According to the first aspect of the disclosure, an image display method applied to an electronic device is provided herein. The image display method includes: establishing an original three-dimensional head portrait model with a plurality of first feature points according to frontal face information of a face, wherein the first feature points form a plurality of first grids on the original three-dimensional head portrait model, and the first feature points define a plurality of feature models on the original three-dimensional head portrait model; establishing a texture mapping figure according to a left face image, a right face image, and the first grids; obtaining a replacement model according to a feature replacement instruction; replacing a selected feature model of the feature models with the replacement model to generate a simulated three-dimensional head portrait model; generating a simulated two-dimensional head portrait image according to the simulated three-dimensional head portrait model and the texture mapping figure; and displaying the simulated two-dimensional head portrait image.

According to the second aspect of the disclosure, an electronic device is provided herein. The electronic device includes: a display unit; an image capture image, configured to capture a left face image and a right face image of a face; and a processing unit, configured to execute following steps: establishing an original three-dimensional head portrait model with a plurality of first feature points according to frontal face information of a face, wherein the first feature points form a plurality of first grids on the original three-dimensional head portrait model, and the first feature points define a plurality of feature models on the original three-dimensional head portrait model; establishing a texture mapping figure according to a left face image, a right face image, and the first grids; obtaining a replacement model according to a feature replacement instruction; replacing a selected feature model of the feature models with the replacement model to generate a simulated three-dimensional head portrait model; generating a simulated two-dimensional head portrait image according to the simulated three-dimensional head portrait model and the texture mapping figure; and enabling the display unit to display the simulated two-dimensional head portrait image.

According to the third aspect of the disclosure, a non-transitory computer readable storage medium storing a plurality of program codes is provided herein. When the program codes are loaded on an electronic device, the electronic device performs the following steps: establishing an original three-dimensional head portrait model with a plurality of first feature points according to frontal face information of a face, wherein the first feature points form a plurality of first grids on the original three-dimensional head portrait model, and the first feature points define a plurality of feature models on the original three-dimensional head portrait model; establishing a texture mapping figure according to a left face image, a right face image, and the first grids; obtaining a replacement model according to a feature replacement instruction; replacing a selected feature model of the feature models with the replacement model to generate a simulated three-dimensional head portrait model; generating a simulated two-dimensional head portrait image according to the simulated three-dimensional head portrait model and the texture mapping figure; and displaying the simulated two-dimensional head portrait image.

Detailed content of other efficacy and embodiments related to the disclosure is described as follows with reference to drawings.

BRIEF DESCRIPTION OF THE DRAWINGS

To describe the technical solutions in embodiments of the disclosure or in the prior art more clearly, the accompanying drawings required for describing the embodiments or the prior art are described briefly below. Apparently, the accompanying drawings in the following description are only some embodiments recorded in the disclosure, and a person of ordinary skill in the art can obtain other accompanying drawings according to the accompanying drawings without creative efforts.

DETAILED DESCRIPTION OF THE EMBODIMENTS

Figure 1:
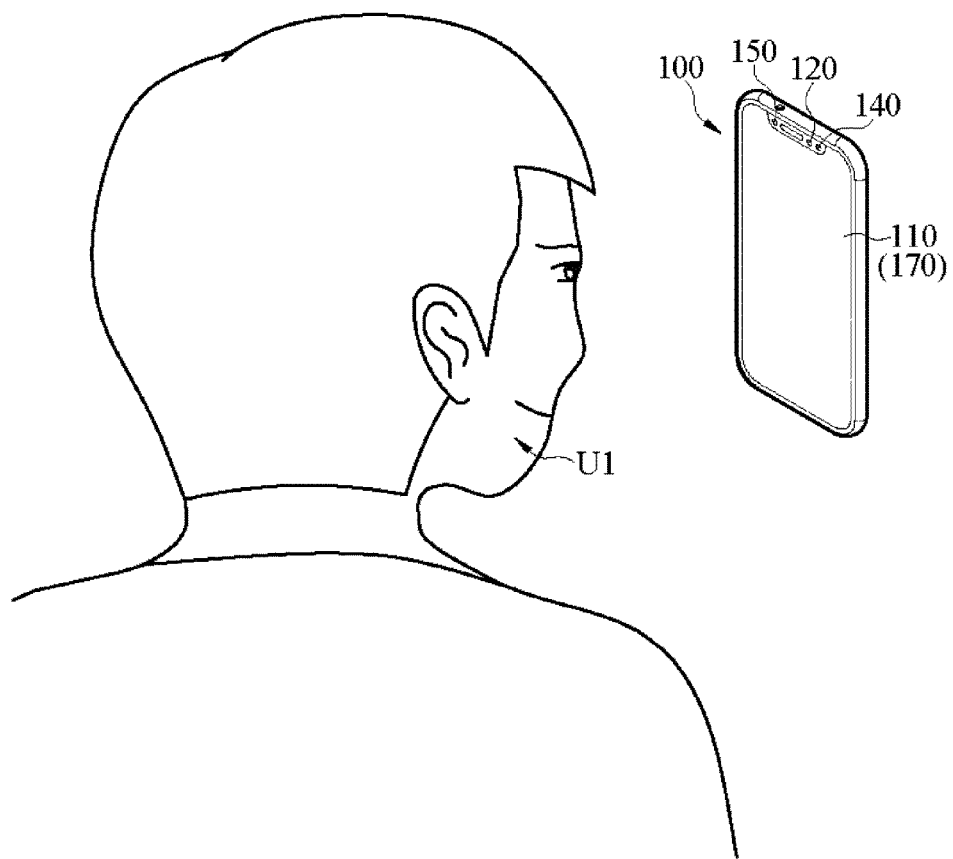
FIG. 1 is a schematic diagram of an embodiment in which a user applies an electronic device.
Figure 2:
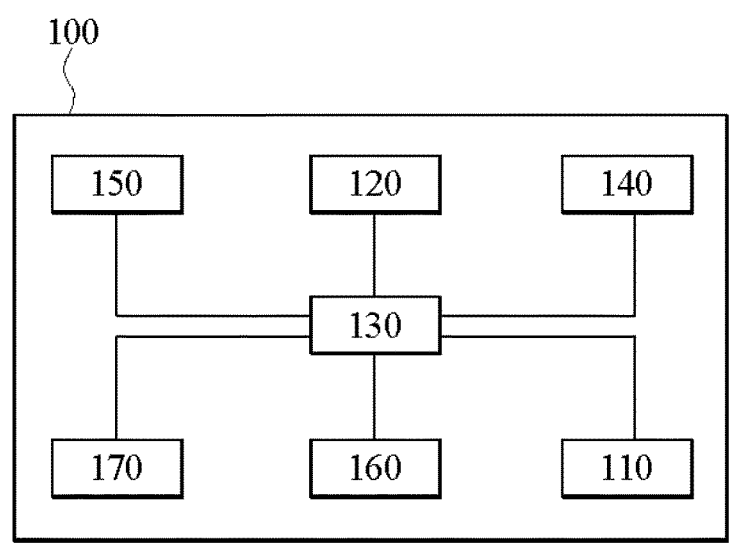
FIG. 2 is a schematic block diagram of an embodiment of an electronic device.

Specific embodiments of this application are further described below with reference to schematic drawings. It should be noted that the accompanying drawings, which are in simplified forms and not drawn to scale, are merely used for facilitating a clear understanding of the embodiments of this application, and should not be construed as limiting this application.

Referring to FIG. 1 to FIG. 21, an image display method in any embodiment of the disclosure is implemented in any electronic device 100, so that the electronic device 100 quickly provides a more lifelike head portrait image after plastic operation for a user to refer to an appearance of the user after the plastic operation. After the plastic operation, the head portrait image provided by the electronic device 100 is changed according to a face of the user, so that the user more dynamically observes the appearance of the user after the plastic operation.

The electronic device 100 includes a display unit 110, an image capture unit 120, and a processing unit 130. In addition, the electronic device 100 further includes a projection unit 140 and a sensing unit 150. The processing unit 130 is coupled to the display unit 110, the image capture unit 120, the projection unit 140, and the sensing unit 150.

In an embodiment, in the image display method, after frontal face information of depth information related to a face U1 of the user is obtained by the processing unit 130, an original three-dimensional head portrait model M1 corresponding to the user is established according to the frontal face information (step S10).

Figure 5:
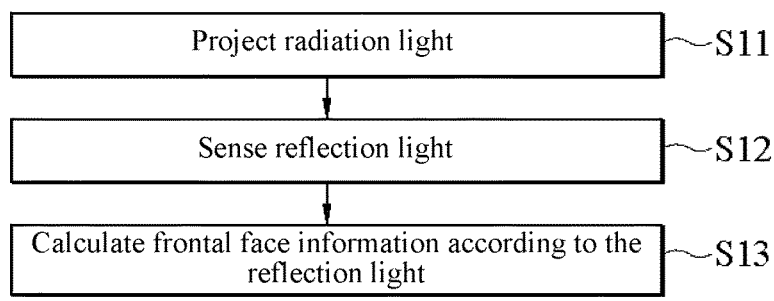
FIG. 5 is a schematic flowchart of an embodiment of step S10 in FIG. 3.
Figure 6:
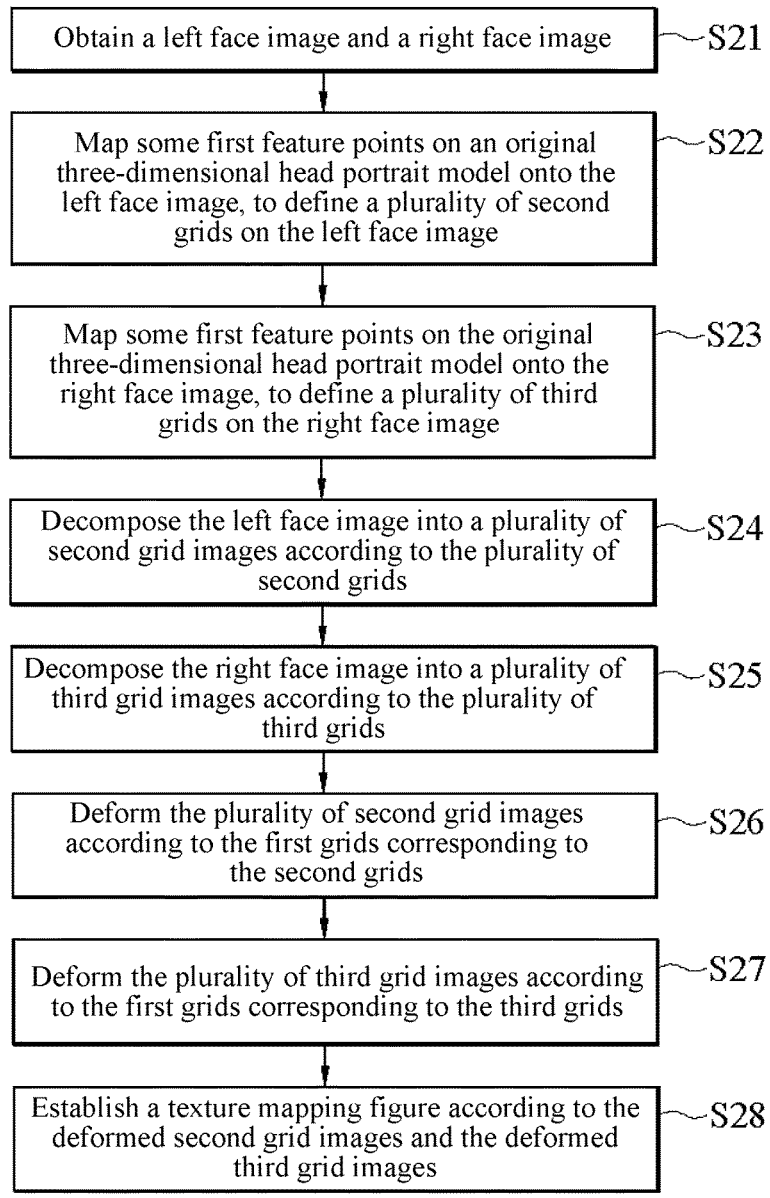
FIG. 6 is a schematic flowchart of an embodiment of step S20 in FIG. 3.
Figure 7:
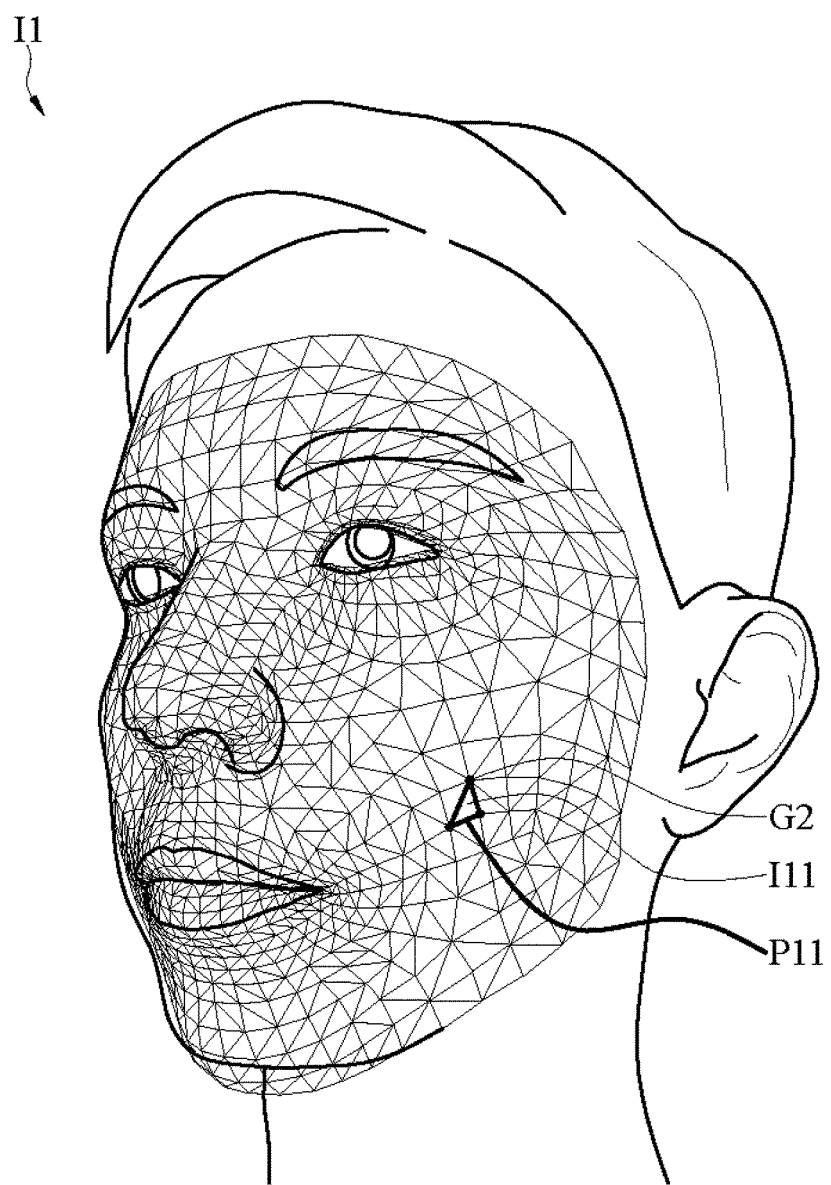
FIG. 7 is a schematic diagram of an embodiment of a left face image.
Figure 8:
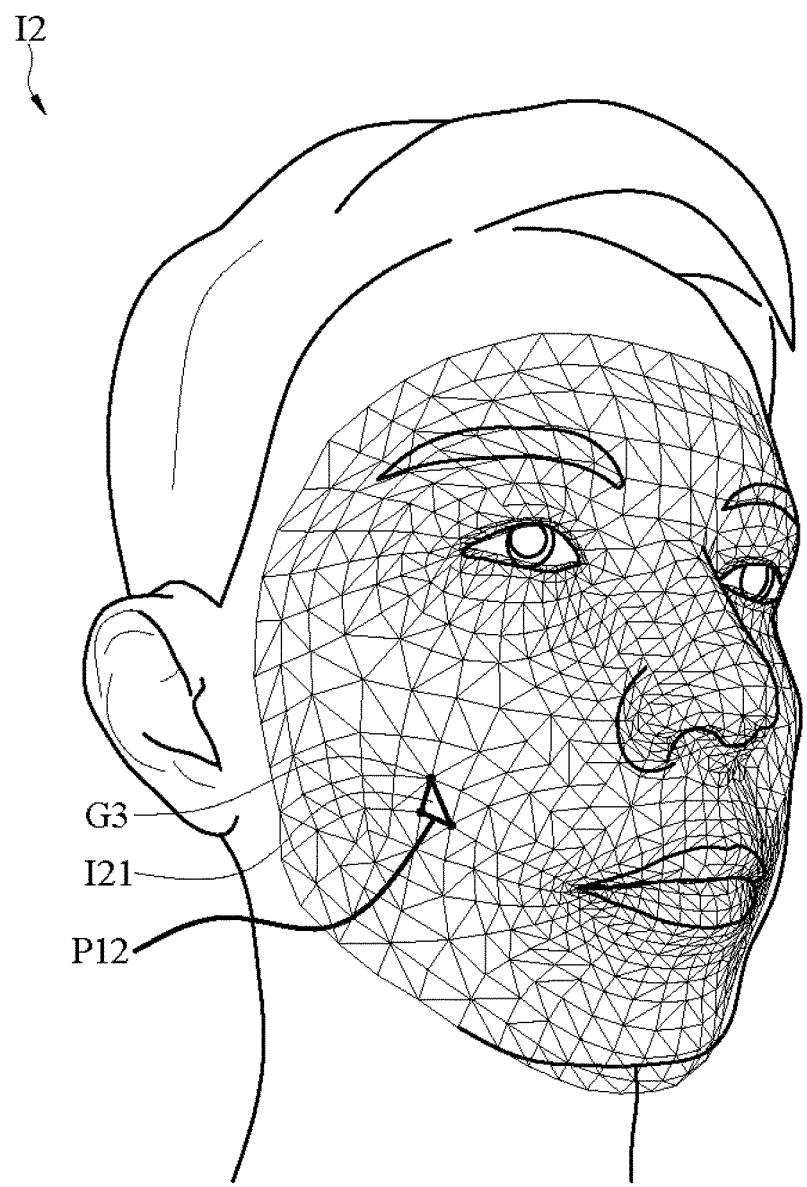
FIG. 8 is a schematic diagram of an embodiment of a right face image.

Referring to FIG. 5, in some embodiments of the step S10, the processing unit 130 enables the projection unit 140 to project radiation light onto the face U1 of the user (step S11), and enables the sensing unit 150 to sense reflection light corresponding to the radiant light and reflected from the face U1 of the user (step S12), thereby calculating, according to the reflection light sensed by the sensing unit 150, frontal face information including facial features and depth information of the face U1 of the user (step S13).

In some embodiment aspects, the projection unit 140 is implemented by using one or more suitable radiation sources, in an embodiment, a diode laser and a light emitting diode. The radiation light projected by the projection unit 140 is structural light. In addition, the radiation light projected by the projection unit 140 is invisible light. In other embodiment, the radiation light projected by the projection unit 140 is visible light.

In some embodiment aspects, the sensing unit 150 is implemented by using an optical sensor corresponding to the projection unit 140. In an embodiment, when the radiation light projected by the projection unit 140 is infrared light, the sensing unit 150 is an infrared camera.

Herein, the processing unit 130 establishes the original three-dimensional head portrait model M1 including a plurality of first feature points P1, and first feature points P1 corresponds to the facial features of the face U1 and forms a plurality of first grids G1 on the original three-dimensional head portrait model M1.

In some embodiment aspects, the processing unit 130 forms the first grids G1 by using a grid technology in a model establishment technology. In an embodiment, the processing unit 130 uses a Delaunay Triangulation technology to form the plurality of first grids G1. In the Delaunay Triangulation technology, the first feature points P1 are taken as vertexes of the first grids G1 to form the first grids G1 with triangular shape.

In addition, the first feature points P1 further define a plurality of feature models M11 to M15 on the original three-dimensional head portrait model M1. The feature models M11 to M15 are facial feature models corresponding to the facial features of the face U1. In an embodiment, the feature model M11 is a left-eye feature model, the feature model M12 is a right-eye feature model, the feature model M13 is a nose feature model, the feature model M14 is a mouth feature model, and the feature model M15 is a chin feature model.

Referring to FIG. 4 to FIG. 15, after the original three-dimensional head portrait model M1 is established, the processing unit 130 establishes a corresponding texture mapping figure F1 according to an correspondence among a left face image I1, a right face image I2, and the first grids G1 of the original three-dimensional head portrait model M1 (step S20).

In some embodiments of the step S20, the processing unit 130 performs image capture on a left face of the face U1 of the user by using the image capture unit 120, to obtain the left face image I1 including the left face of the face U1, and performs image capture on a right face of the face U1 of the user by using the image capture unit 120, to obtain the right face image I2 including the right face of the face U1 (step S21).

Figure 9:
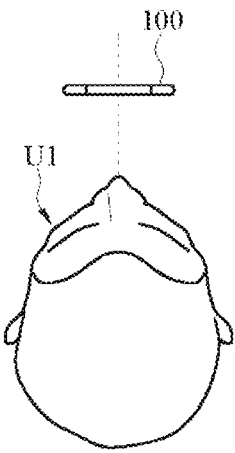
FIG. 9 is a schematic diagram of an embodiment in which a face faces an electronic device.
Figure 10:
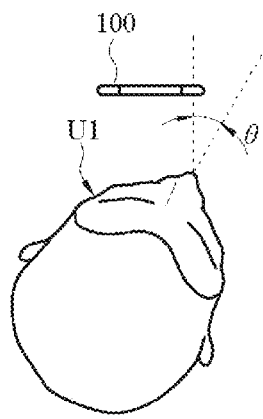
FIG. 10 is a schematic diagram of an embodiment in which a face turns to the right of an electronic device.
Figure 11:
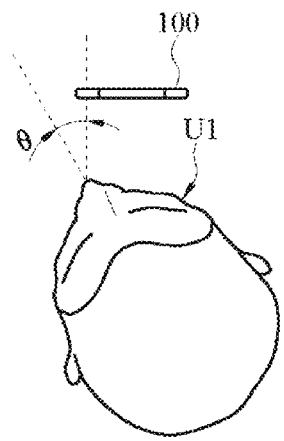
FIG. 11 is a schematic diagram of an embodiment in which a face turns to the left of an electronic device.

In some embodiments of the step S21, the processing unit 130 detects a deflection angle θ existing between the face U1 of the user and the image capture unit 120 by using the image capture unit 120 and a real-time image recognition technology. In addition, when the processing unit 130 detects that a deflection angle θ existing between the face U1 and the image capture unit 120, the processing unit 130 automatically enables the image capture unit 120 to perform image capture on the face U1 to obtain the left face image I1 or the right face image I2. Herein, the deflection angle θ is zero degree when the face U1 faces the image capture unit 120, as shown in FIG. 9. In addition, the deflection angle θ has positive degrees when the face U1 turns right relative to the image capture unit 120, as shown in FIG. 10. The deflection angle θ has negative degrees when the face U1 turns left relative to the image capture unit 120, as shown in FIG. 11. In some embodiment aspects, the deflection angle θ is between from 30 degrees to 45 degrees or between from −30 degrees to −45 degrees.

In some embodiment, the image capture unit 120 is an image capture device including one lens or more lenses and a light sensitivity assembly, such as at least one of a complementary metal-oxide-semiconductor (CMOS) or a charge coupled device (CCD).

After the step S21, the processing unit 130 maps the first feature points P11 of the first feature points P1 on the original three-dimensional head portrait model M1 (that is, the first feature points P11 is a first part of the first feature points P1) onto the left face image I1 to define a plurality of second grids G2 on the left face image I1, wherein the first feature points P11 of the first feature points P1 are corresponding to the left face of the face U1 (step S22). The processing unit 130 maps some first feature points P12 of the first feature points P1 on the original three-dimensional head portrait model M1 (that is, the first feature points P12 is a second part of the first feature points P1) onto the right face image I2 to define a plurality of third grids G3 on the right face image I2, wherein the first feature points P12 corresponding to the right face of the face U1 (step S23).

In some embodiments, the first feature points P11 mapped onto the left face image I1 and the first feature points P12 mapped onto the right face image I2 partially overlap (that is, the first part of the first feature points P1 and the second part of first the feature points P1 are partially overlapped). In an embodiment, a nose feature appears on the left face image I2, and also appears on the right face image I2. Therefore, a first feature point P11 on the left face image I1 corresponding to the nose feature and a first feature point P12 on the right face image I2 corresponding to the nose feature are mapped from a same first feature point P1 on the original three-dimensional head portrait model M1.

In some embodiments of the step S22, the processing unit 130 takes the first feature points P11 mapped onto the left face image I1 as vertexes of the second grids G2 by using the grid technology, to define the plurality of second grids G2 on the left face image I1. Similarly, in some embodiments of the step S23, the processing unit 130 takes the first feature points P12 mapped onto the right face image I2 as vertexes of the third grids G3 by using the grid technology, to define the plurality of third grids G3 on the right face image I2. In some embodiment, the grid technology applied by the processing unit 130 is Delaunay Triangulation.

After the step S22 and the step S23, the processing unit 130 decomposes the left face image I1 into a plurality of second grid images I11 according to the second grids G2 formed on the left face image I1 (step S24). In addition, the processing unit 130 decomposes the right face image I2 into a plurality of third grid images I21 according to the third grids G3 formed on the right face image I2 (step S25). Then, the processing unit 130 deforms the second grid images I11 according to the shape and the size of each of the first grids G1 corresponding to the second grids G2 (step S26). In addition, the processing unit 130 deforms the third grid images I21 according to the shape and the size of each of the first grids G1 corresponding to the third grids G3 (step S27). Finally, the processing unit 130 establishes a texture mapping figure F1 according to the deformed second grid images I11' and the deformed third grid images I21' (step S28).

In some embodiments, the original three-dimensional head portrait model M1 with a curved surface is unrolled to the texture mapping F1 that is two-dimensional type. The texture mapping figure F1 includes a plurality of texture blocks B1. Each texture block B1 corresponds to one of the plurality of first grids G1. Herein, each the texture block B1 is two-dimension and corresponding to one of the first grids G1 of the curved surface of the original three-dimensional head portrait model M1. Vertexes T1 of the texture blocks B1 correspond to feature points P1 included by the first grids G1 corresponding to the vertexes T1. Since the second grids G2 are corresponding to the first grids G1 and the texture blocks B1 are formed by the first grids G1, the second grids G2 are corresponding to the texture blocks B1. Similarly, the third mesh G3 are corresponding to the texture blocks B1.

In some embodiments of the step S27 and the step S28, the processing unit 130 deforms the second grid images I11 and the third grid images I21 by using mapping transformation, such as a combination of translation, rotation, scaling, reflection, or transvection.

In some embodiment aspects, the first feature points P11 on the left face image I1 have corresponding two-dimensional coordinates. The vertexes T1 of the texture blocks B1 have corresponding texture coordinates. The processing unit 130 maps the first feature points P11 included by the second grids G2 onto the vertexes T1 of the corresponding texture blocks B1 by matrix transformation. In this way, the shape and the size of each of the second grid images I11 decomposed by each second grid G2 is the same as the shape and the size of the corresponding texture block B1 by deforming each of the second grid image I11. Similarly, the first feature points P12 on the right face image I2 also have corresponding two-dimensional coordinates. The processing unit 130 maps the first feature points P12 included by the third grids G3 onto the vertexes T1 of the corresponding texture blocks B1 by matrix transformation. In this way, the shape and the size of each of the third grid images I21 decomposed by each the third grids G3 is the same as the shape and the size of the corresponding texture blocks B1 by deforming each third grid image I21.

In some embodiments, the texture mapping figure F1 comprises a left texture mapping figure F11, a central texture mapping figure F12, and a right texture mapping figure F13 connected in sequence from right to left. In addition, the deformed second grid images I11' are divided into a first deformed second grid images and a second deformed second grid images, and the deformed third grid images I21' are also divided into a first deformed third grid images and a second deformed third grid images.

Herein, each of the first deformed second grid images I11' corresponds to one of a plurality of texture blocks B1 in the left texture mapping figure F11. Each of the second deformed second grid images I11' corresponds to one of a plurality of texture blocks B1 in the central texture mapping figure F12. In addition, each of the first deformed third grid images I21' corresponds to one of a plurality of texture blocks B1 in the right texture mapping figure F13. Each of the second deformed third grid images I21' corresponds to one of a plurality of texture blocks B1 in the central texture mapping figure F12. In other words, each of the texture blocks B1 in the central texture mapping figure F12 corresponds to one of the second deformed second grid images I11' and one of the second deformed third grid images I21'.

Figure 12:
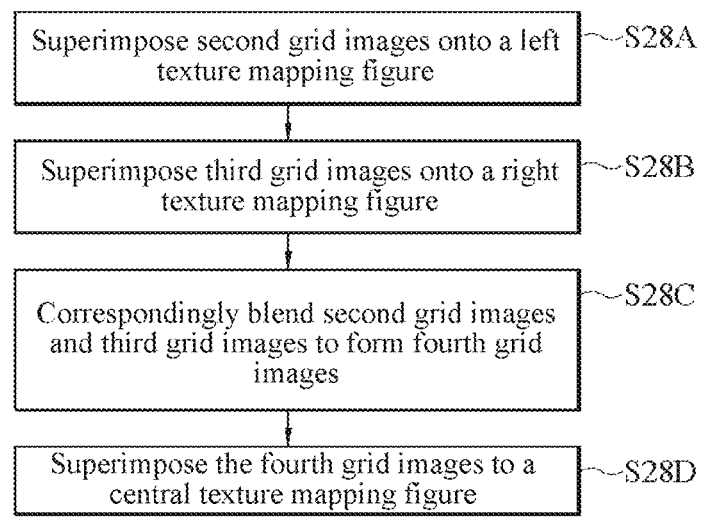
FIG. 12 is a schematic flowchart of an embodiment of step S28 in FIG. 6.
Figure 13:
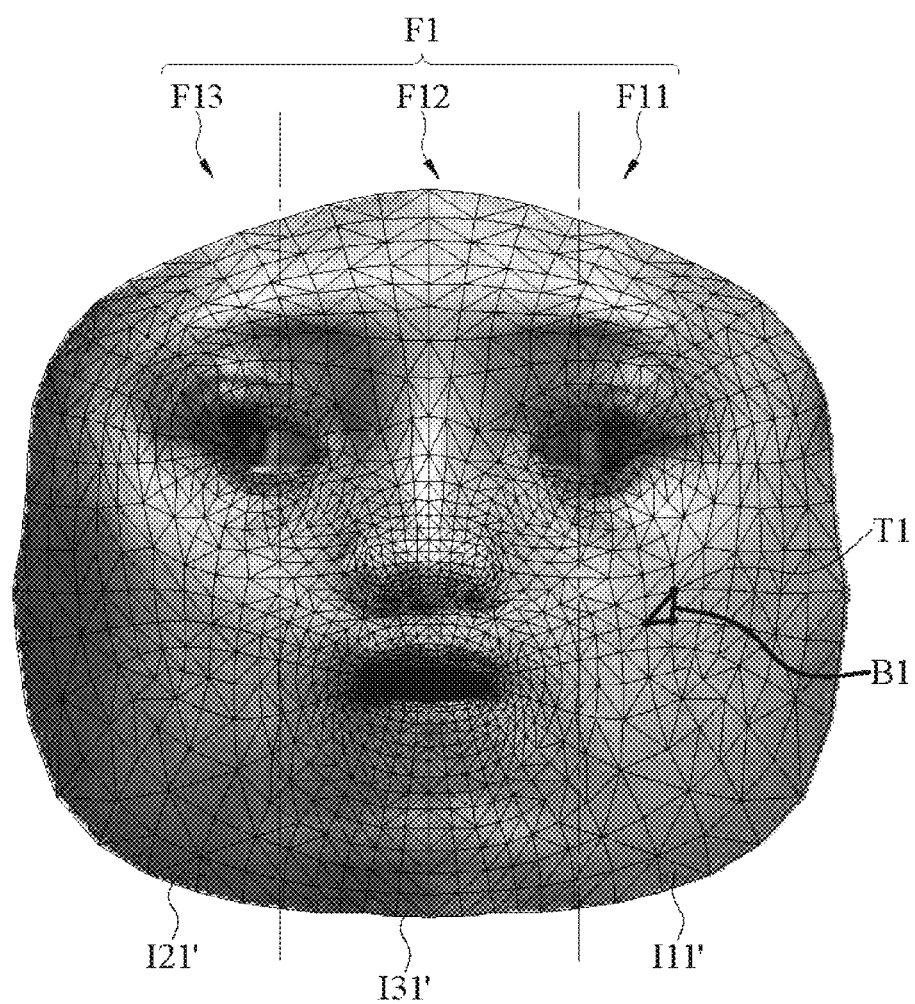
FIG. 13 is a schematic diagram of an embodiment of a texture mapping figure.

Referring to FIG. 12, in some embodiments of the step S28, the processing unit 130 respectively superimposes the first deformed second grid images I11' onto the corresponding texture blocks B1 in the left texture mapping figure F11 (step S28A). The processing unit 130 superimposes the first deformed third grid images I21' onto the corresponding texture blocks B1 in the right texture mapping figure F13 (step S28B). In addition, in order to smooth an image seam in the established central texture mapping figure F12, the processing unit 130 blends the second deformed second grid images I11' and the second deformed third grid images I21' corresponding to the texture blocks B1 in the central texture mapping figure F12, to form fourth grid images I31' according to a first weight and a second weight of each texture block B1 in the central texture mapping figure F12, wherein the first weight is used for the second deformed second grid image I11' and the second weight is used for the second deformed third grid images I21'(step S28C). Then, the processing unit 130 superimposes all the fourth grid images I31' generated in the step S28C onto the central texture mapping figure F12 (step S28D), to establish the entire texture mapping figure F1, as shown in an embodiment of FIG. 13.

In some embodiments, the first weight and the second weight of one texture block B1 are different from the first weight and the second weight of another texture block B1. However, a total value of a first weight and a second weight that of each texture block B1 is 1. In an embodiment, when a texture block B1 is in the central texture mapping figure F12 but close to the left texture mapping figure F11, a first weight of the texture block B1 is 0.75, and a second weight of the texture block B1 is 0.25. Therefore, in the fourth grid images I31' blended by the second deformed second grid image and the second deformed third grid image corresponding to the texture block B1, a proportion of the second deformed second grid images I11' is higher than that of the second deformed third grid images I21'.

Figure 3:
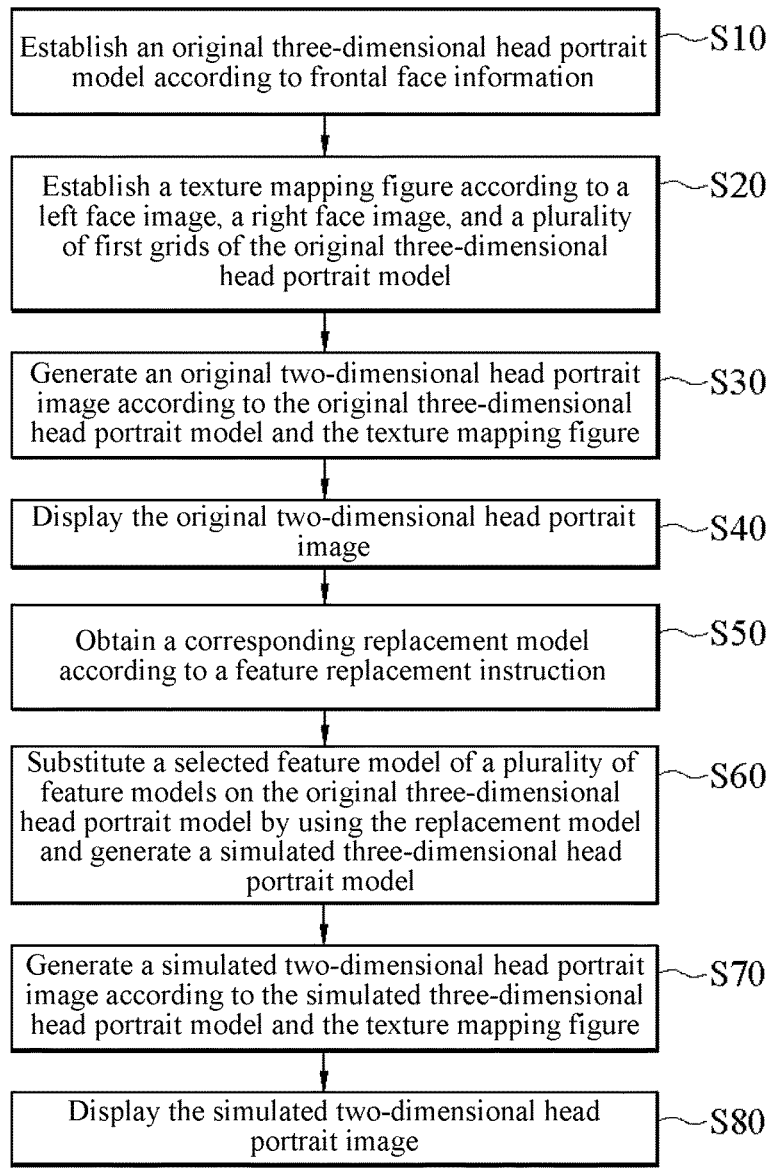
FIG. 3 is a schematic flowchart of an embodiment of a display method.
Figure 4:
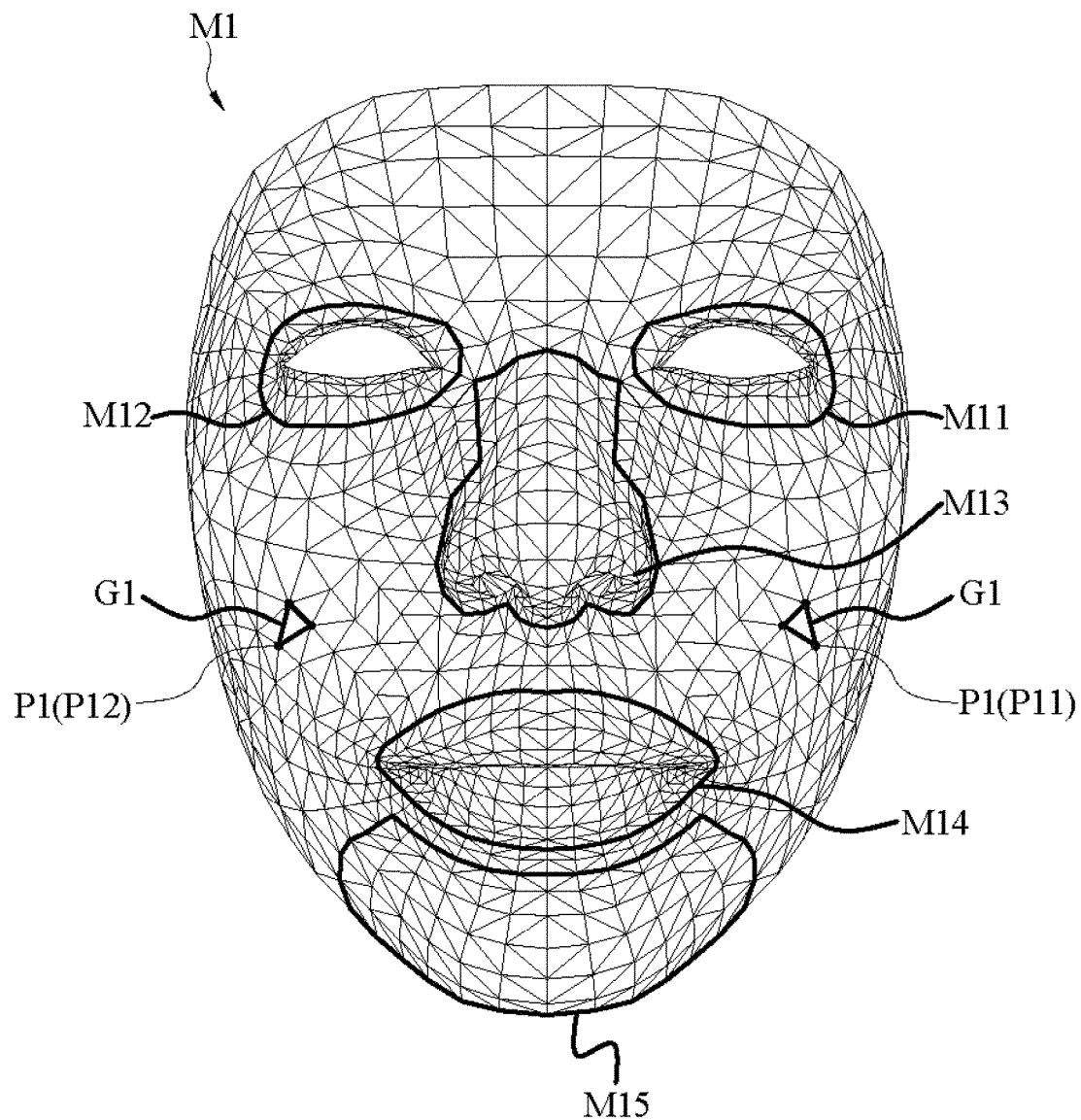
FIG. 4 is a schematic diagram of an embodiment of an original three-dimensional head portrait model.
Figure 14:
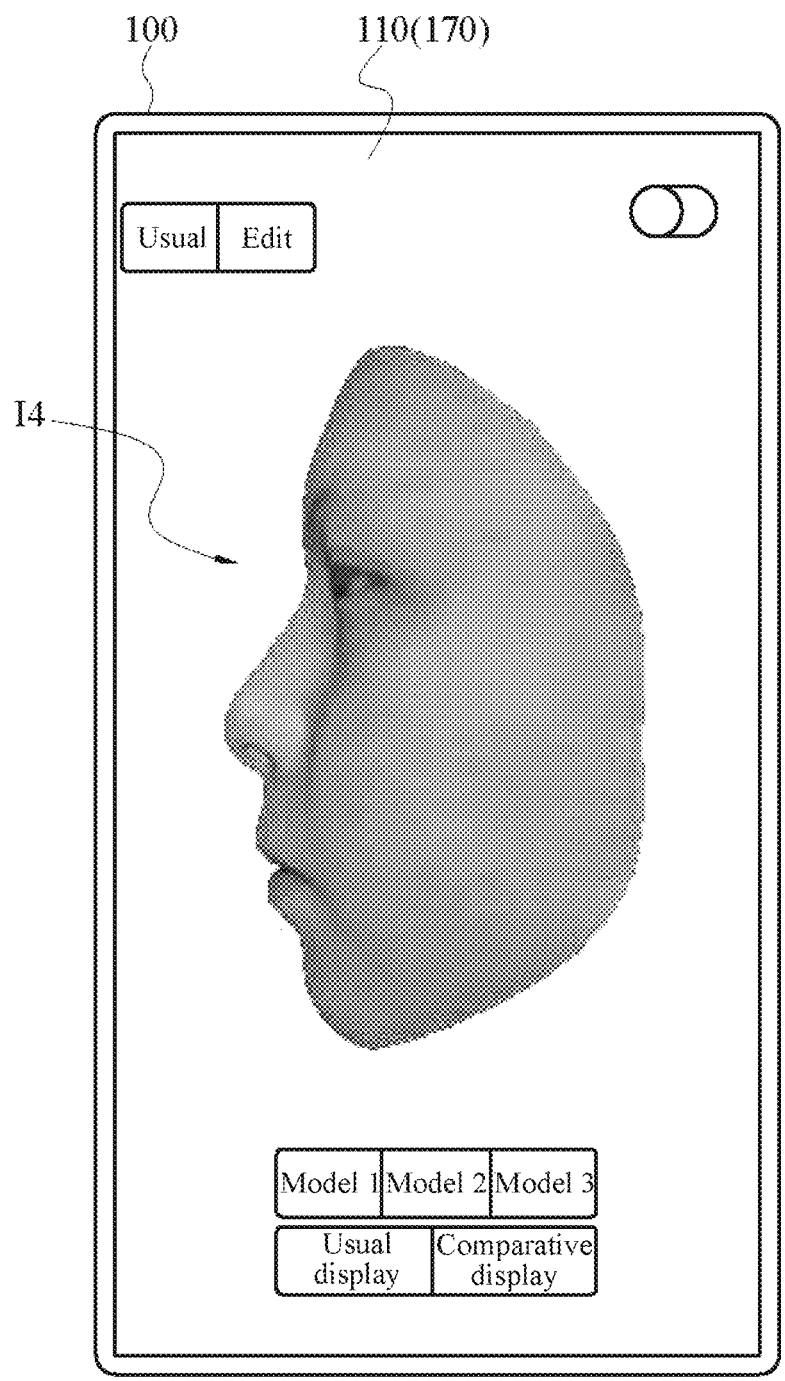
FIG. 14 is a schematic diagram of an embodiment of a two-dimensional head portrait image.

Referring to FIG. 3 and FIG. 14, in some embodiments, the processing unit 130 first generates a corresponding two-dimensional head portrait image I4 according to the original three-dimensional head portrait model M1 and the texture mapping figure F1 after generating the original three-dimensional head portrait model M1 and the texture mapping figure F1 (step S30). The display unit 110 displays the two-dimensional head portrait image I4 for the user to view (step S40). Herein, the two-dimensional head portrait image I4 is approximately the same as the face of the user and is real.

In an embodiment of the step S30, the processing unit 130 superimposes the texture mapping figure F1 onto the original three-dimensional head portrait model M1 to generate the corresponding two-dimensional head portrait image I4. In another embodiment, an angle of the original three-dimensional head portrait model M1 is adjusted and then the texture mapping figure F1 is superimposed onto the original three-dimensional head portrait model M1 that has been adjusted angle, to transform to the corresponding two-dimensional head portrait image I4. As shown in FIG. 14, FIG. 14 shows a form of the two-dimensional head portrait image I4 whose head portrait angle relative to the image capture unit 120 is 90 degrees.

In some embodiments, the processing unit 130 applies different aesthetic scales to the two-dimensional head portrait image I4, to perform scale quantization analysis of the facial features. In addition, the processing unit 130 superimposes the scale quantization analysis results onto the two-dimensional head portrait image I4 and enables the display unit 110 to display the two-dimensional head portrait image I4 with the scale quantization analysis results, so that the user clearly learn of a current scale of the face U1 of the user. In addition, in plastic surgery application, the two-dimensional head portrait image I4 on which the scale quantization analysis results are superimposed further enables a plastic surgeon to quickly provide plastic suggestion for a user accordingly.

Figure 15:
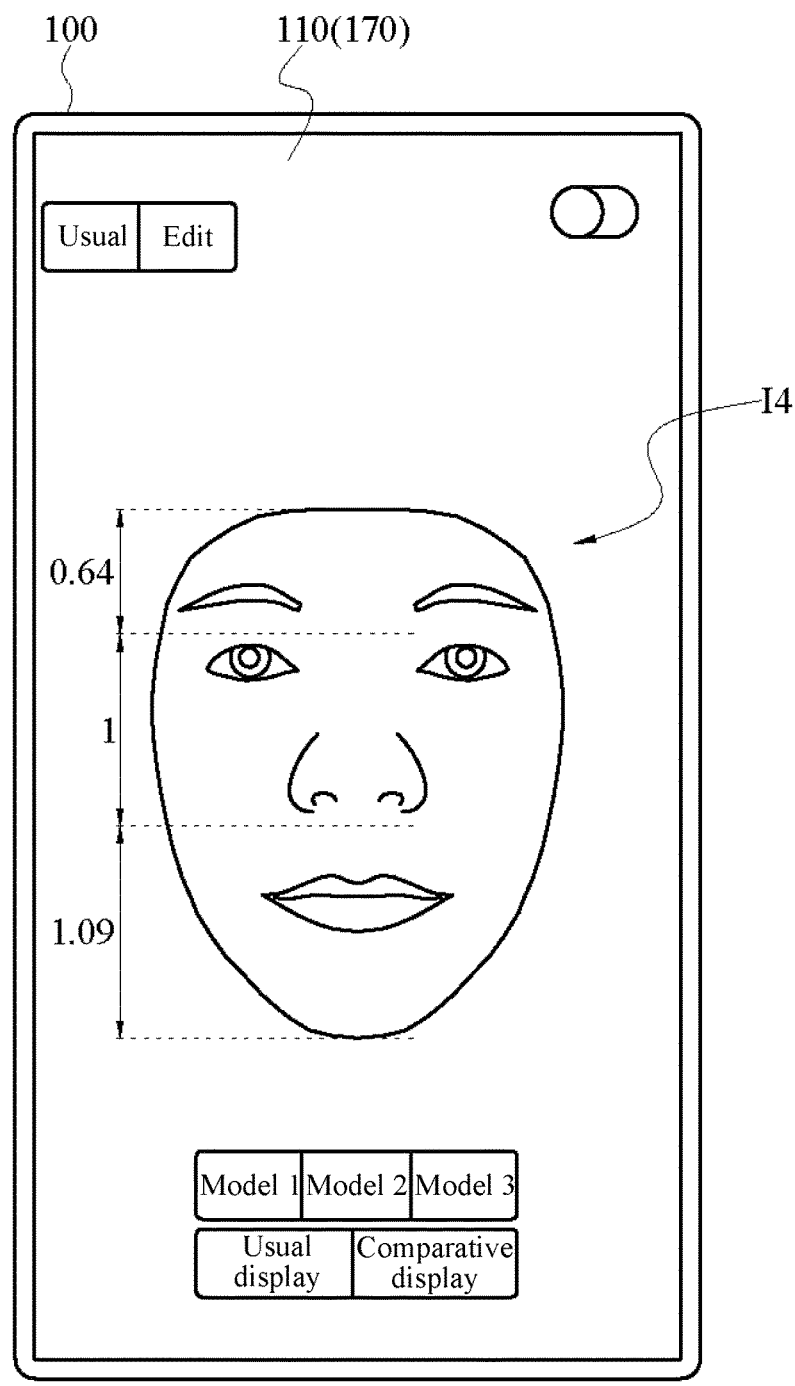
FIG. 15 is a schematic diagram of an embodiment of a two-dimensional head portrait image on which scale quantization analysis results are superimposed.

To conform to a general public aesthetic principle, in some embodiment aspects, the processing unit 130 transversely divides a face in the two-dimensional head portrait image I4 into three parts. An upper part is from forehead to eyebrows, a middle part is from eyebrows to tip of nose, and a lower part is from tip of nose to chin. The processing unit 130 marks a ratio between the upper part, the middle part, and the lower part on the two-dimensional head portrait image I4, as shown in FIG. 15.

Figure 16:
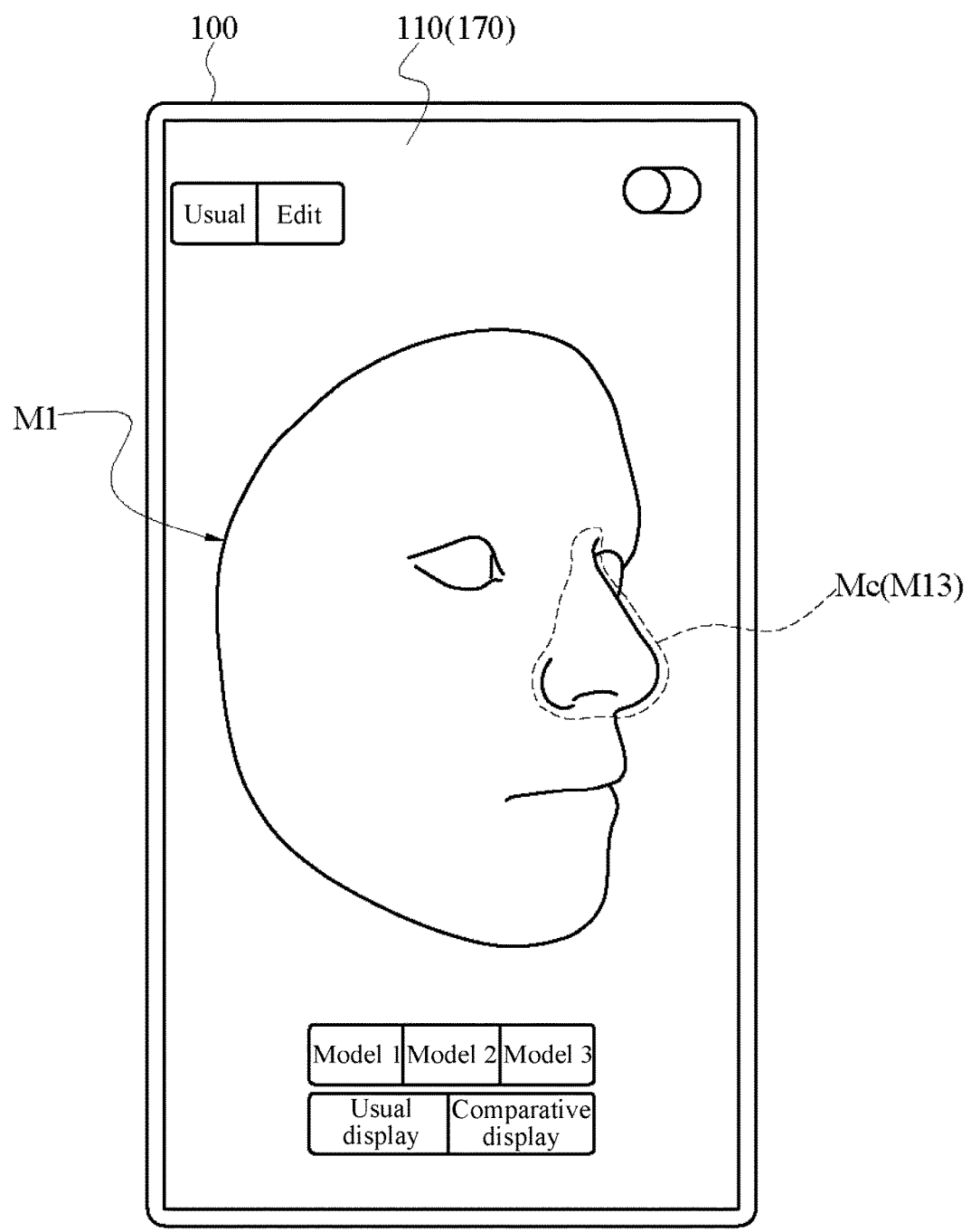
FIG. 16 is a schematic diagram of an embodiment of an original three-dimensional head portrait model.
Figure 17:
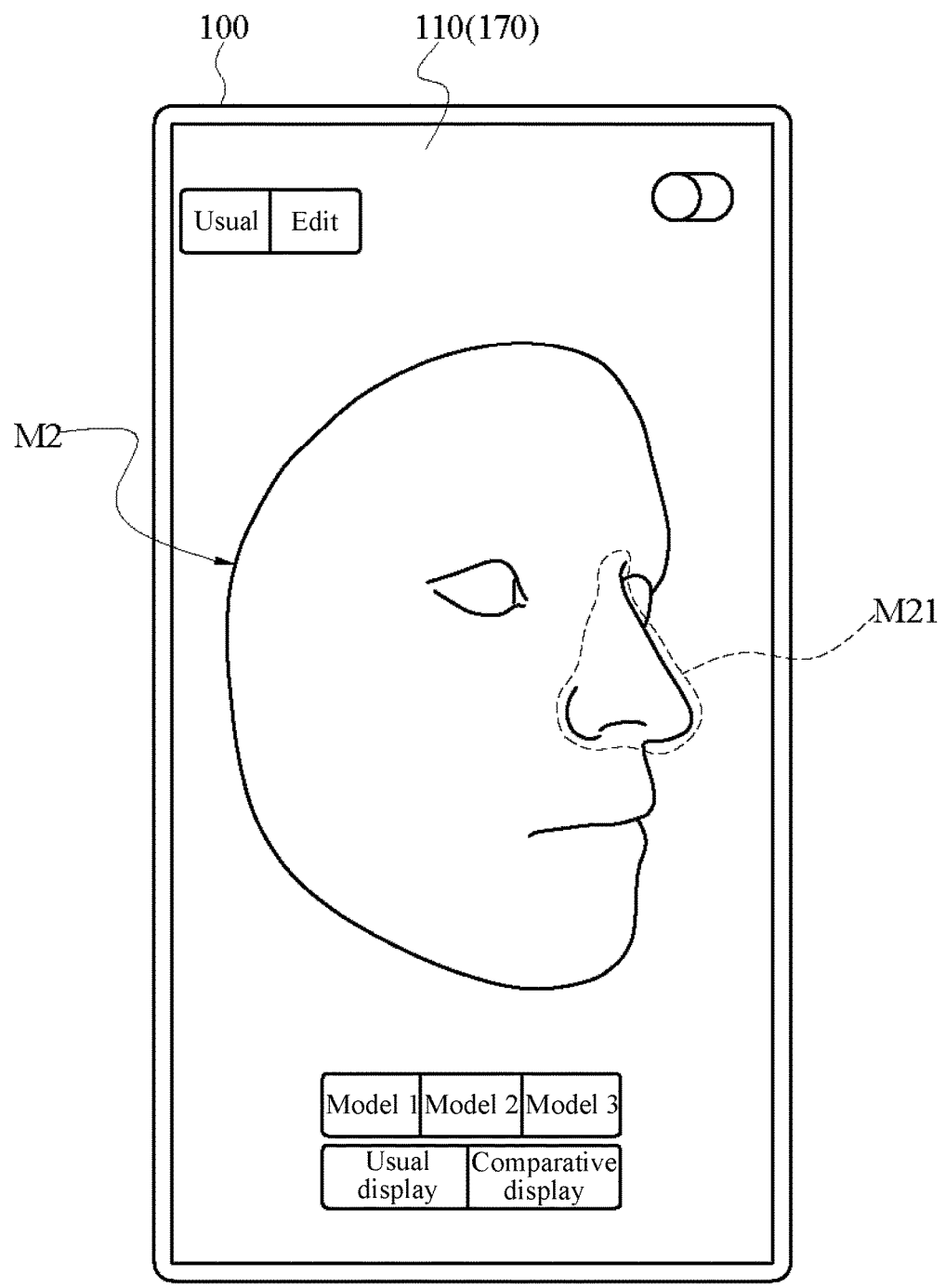
FIG. 17 is a schematic diagram of an embodiment of a simulated three-dimensional head portrait model.

Referring to FIG. 3, FIG. 16, and FIG. 17, in an embodiment of the image display method, the processing unit 130 receives a feature replacement instruction, and obtains a corresponding replacement model M21 according to the feature replacement instruction (step S50). Later, the processing unit 130 substitutes a selected feature model Mc of a plurality of feature models M11 to M14 on the original three-dimensional head portrait model M1 by using the replacement model M21 in a modulate replacement manner, and generates a simulation three-dimensional head portrait model M2 after replacement (step S60).

In some embodiments, the electronic device 100 further includes an input interface 170. The input interface 170 is coupled to the processing unit 130. Herein, the user generates the feature replacement instruction by using the input interface 170. In an embodiment, as shown in FIG. 17, the user generates a corresponding feature replacement instruction by clicking and selecting "model 3" on the input interface 170.

In some embodiments, the electronic device 100 further includes a replacement model database 160 storing a large quantity of replacement models M21. The replacement model database 160 is coupled to the processing unit 130. The replacement models M21 include various models of the facial features, in an embodiment, various nose replacement models, various left-eye replacement models, various right-eye replacement models, various mouth replacement models, and various chin replacement models. In some embodiment aspects, the replacement model database 160 classifies the stored replacement models according to countries, races, and the like.

In some embodiments of the step S50, the processing unit 130 searches the replacement model database 160 according to the feature replacement instruction, to obtain the corresponding replacement models M21.

Figure 18:
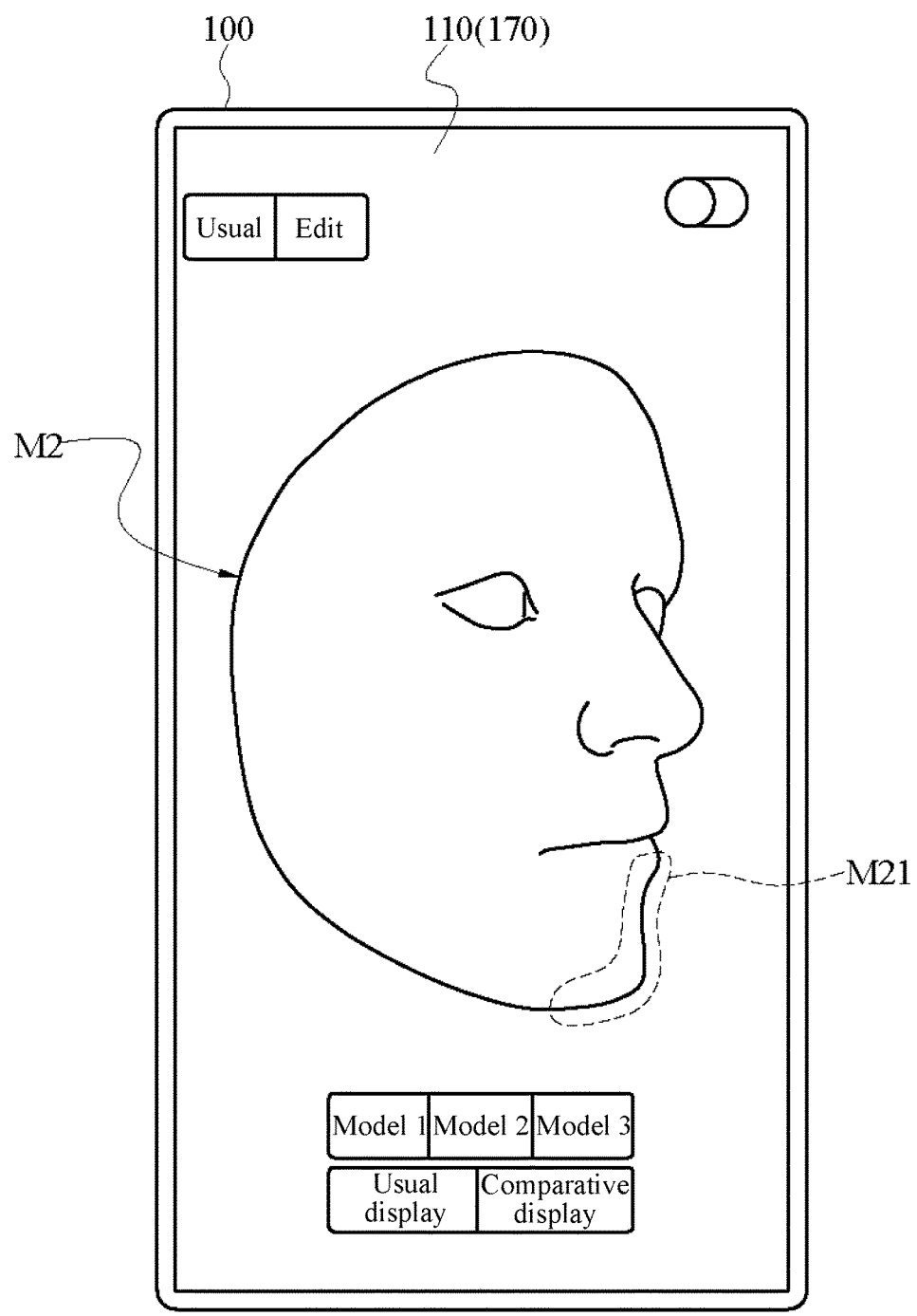
FIG. 18 is a schematic diagram of another embodiment of a simulated three-dimensional head portrait model.

In some embodiments of the step S60, the processing unit 130 first removes the selected feature model Mc from the original three-dimensional head portrait model M1, and then combines the replacement model M21 based on an original position of the selected feature model Mc, to complete a replacement operation. In some embodiments, the processing unit 130 first performs corresponding scale adjustment on the replacement models M21 according to a scale of the selected feature model Mc, and then substitutes the selected feature model Mc by using the replacement model M21 after adjustment. In an embodiment, when it is assumed that the selected feature model Mc is the feature model M13 of the nose, the processing unit 130 obtains a width of the nose of the feature model M13 according to two ends of a wing of the nose of the feature model M13 of the nose, and adjusts widths of noses of the replacement models M21 according to the obtained width of the nose. In an embodiment, after adjusting the widths of the noses of the replacement models M21 to be the same as the width of the nose of the feature model M13 of the nose, the processing unit 130 then substitutes the feature model M13 of the nose by using the replacement models M21 after adjustment to generate the simulated three-dimensional head portrait model M2, as shown in FIG. 17. In another embodiment, when the selected feature model Mc is the feature model M15 of the chin, the processing unit 130 adjusts widths of chins of the replacement models M21 to be the same as a width of a chin of the selected feature model Mc, and then substitutes the feature model M15 of the chin by using the replacement model M21 after adjustment to generate the simulated three-dimensional head portrait model M2, as shown in FIG. 18.

Figure 19:
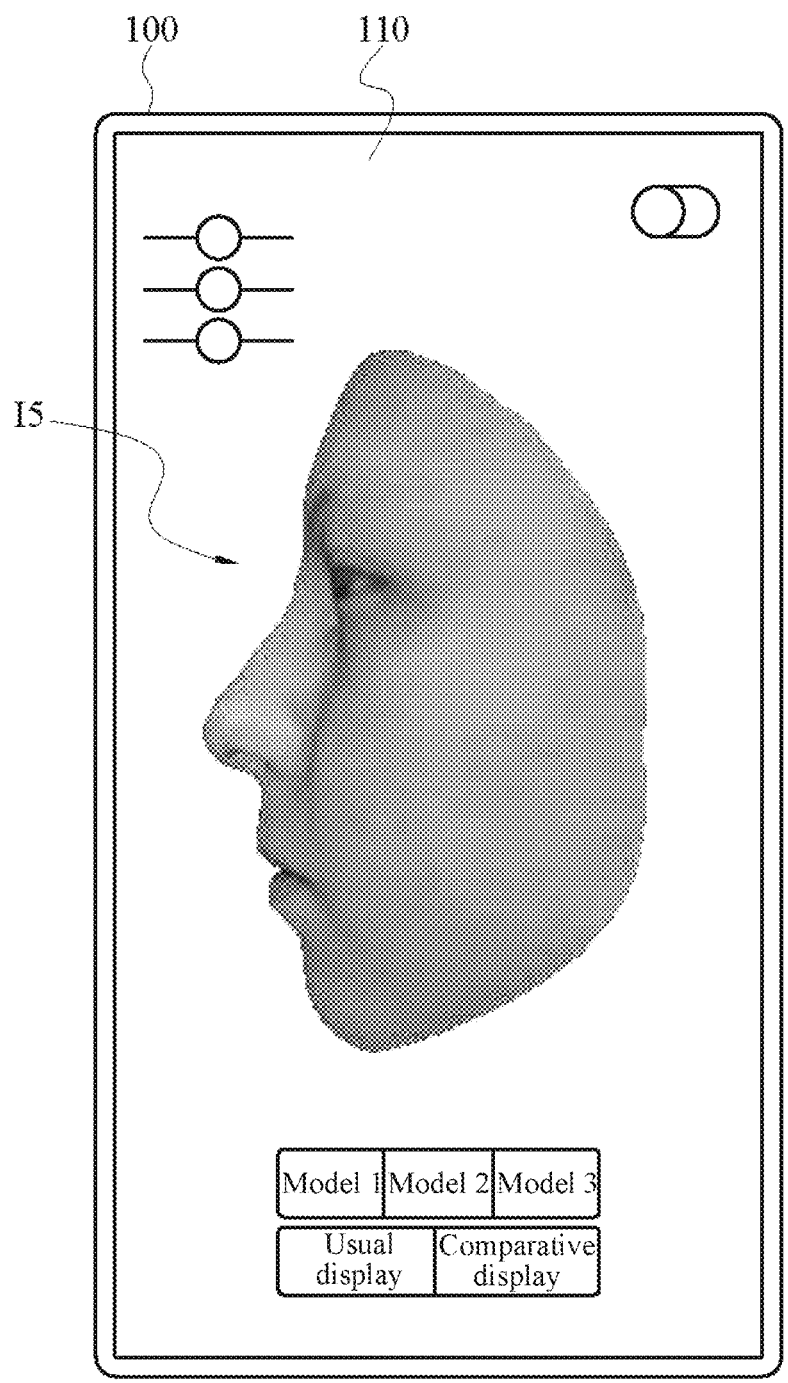
FIG. 19 is a schematic diagram of an embodiment of a simulated two-dimensional head portrait image.

Referring to FIG. 3 and FIG. 19, after generating the simulated three-dimensional head portrait model M2, the processing unit 130 generates a corresponding simulated two-dimensional head portrait image I5 according to the simulated three-dimensional head portrait model M2 and the texture mapping figure F1 (step S70). The display unit 110 displays the simulated two-dimensional head portrait image I5 for the user to view a changed appearance of the user (step S80).

In an embodiment of the step S70, the simulated three-dimensional head portrait model M2 also includes fourth grids similar to the first grids G1 on the original three-dimensional head portrait model M1. The fourth grids on the simulated three-dimensional head portrait model M2 correspond with the texture blocks B1 of the texture mapping figure F1. Then, the processing unit 130 superimposes the texture mapping figure F1 onto the simulated three-dimensional head portrait model M2 according to the correspondence to generate the corresponding simulated two-dimensional head portrait image I5. In another embodiment, the processing unit 130 adjusts an angle of the simulated three-dimensional head portrait model M2 and superimposes the texture mapping figure F1 onto the simulated three-dimensional head portrait model M2 whose angle has been adjusted, to transform into the corresponding simulated two-dimensional head portrait image I5.

In some embodiments, the user further generates a fine adjustment instruction by using the input interface 170, so that the processing unit 130 performs fine adjustment operation on the replacement model M21 on the simulated three-dimensional head portrait model M2 according to the fine adjustment instruction. The simulated two-dimensional head portrait image I5 displayed by the display unit 110 is correspondingly changed corresponding to the performed fine adjustment operation. Herein, the user enables the electronic device 100 to repeatedly perform the fine adjustment operation until the simulated three-dimensional head portrait model M2 that the user is satisfied with is fine adjusted. In some embodiment, as shown in FIG. 19, the user generates the corresponding fine adjustment instruction by pulling a fine adjustment knob on the input interface 170.

In some embodiments, the user further adjusts the head portrait angle of the simulated three-dimensional head portrait model M2 by using the input interface 170, to enable the simulated two-dimensional head portrait image I5 displayed by the display unit 110 to change a display angle corresponding to the simulated three-dimensional head portrait model M2, so that the user views from different angles to determine whether a result after simulated replacement meets expectations of the user.

In some embodiment aspects, the input interface 170 is integrated to the display unit 110, in an embodiment, is implemented by using a touch display. In another embodiment, the input interface 170 is alternatively an independent input device, in an embodiment, a mouse and a touch pad.

Figure 20:
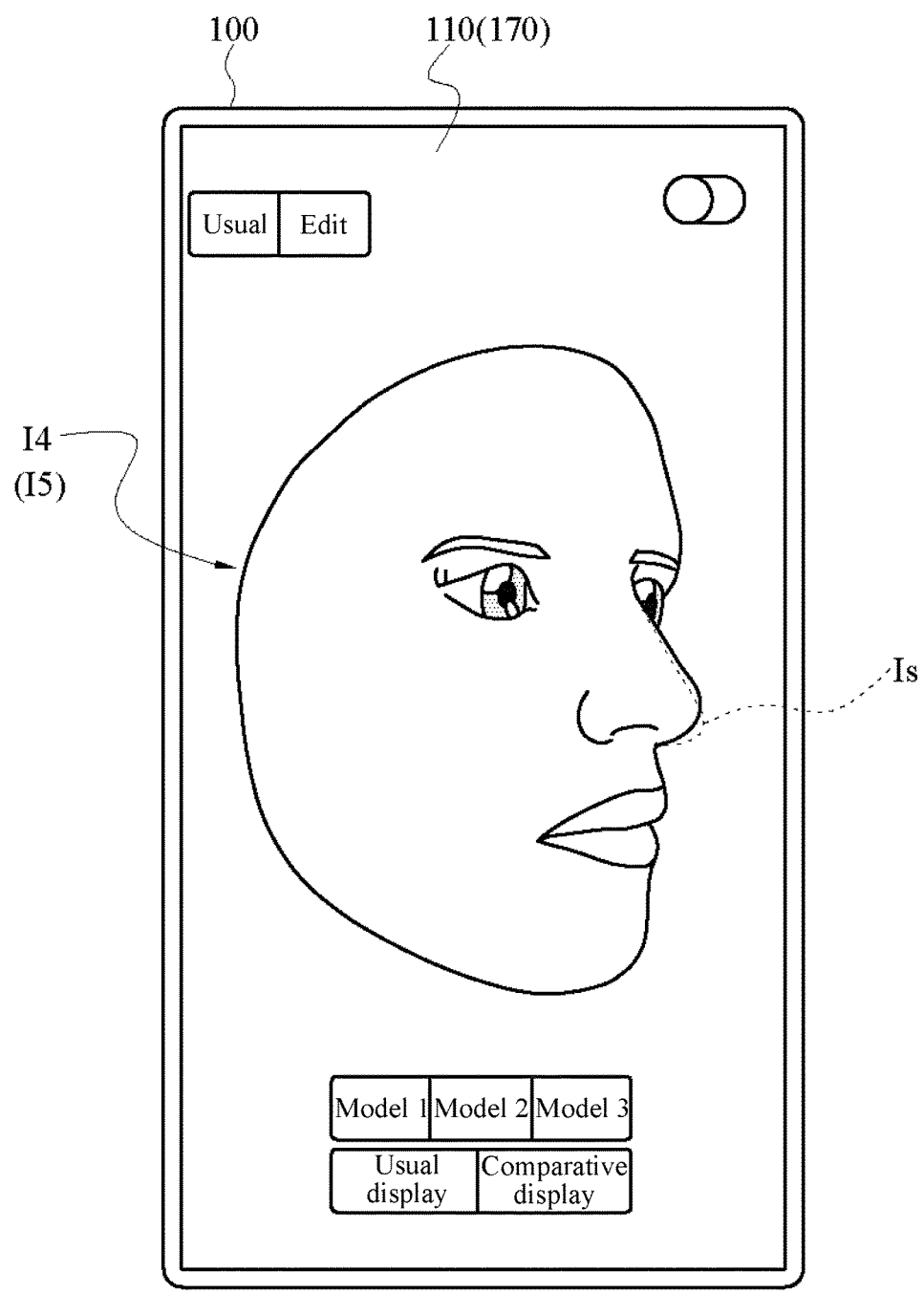
FIG. 20 is a schematic diagram of an embodiment in which a simulated two-dimensional head portrait image and a two-dimensional head portrait image are displayed in a superimposed manner.

In some embodiments, the processing unit 130 further enables the simulated two-dimensional head portrait image I5 and the two-dimensional head portrait image I4 to display in a superimposed manner, and enables a replacement image Is in the simulated two-dimensional head portrait image I5 that correspond to the replacement model M21 to display in a semi-transparent manner, so that the user accordingly compares effects before and after a change of the user. As shown in FIG. 20, the replacement image having a semi-transparent effect is drawn by using a dashed line.

Figure 21:
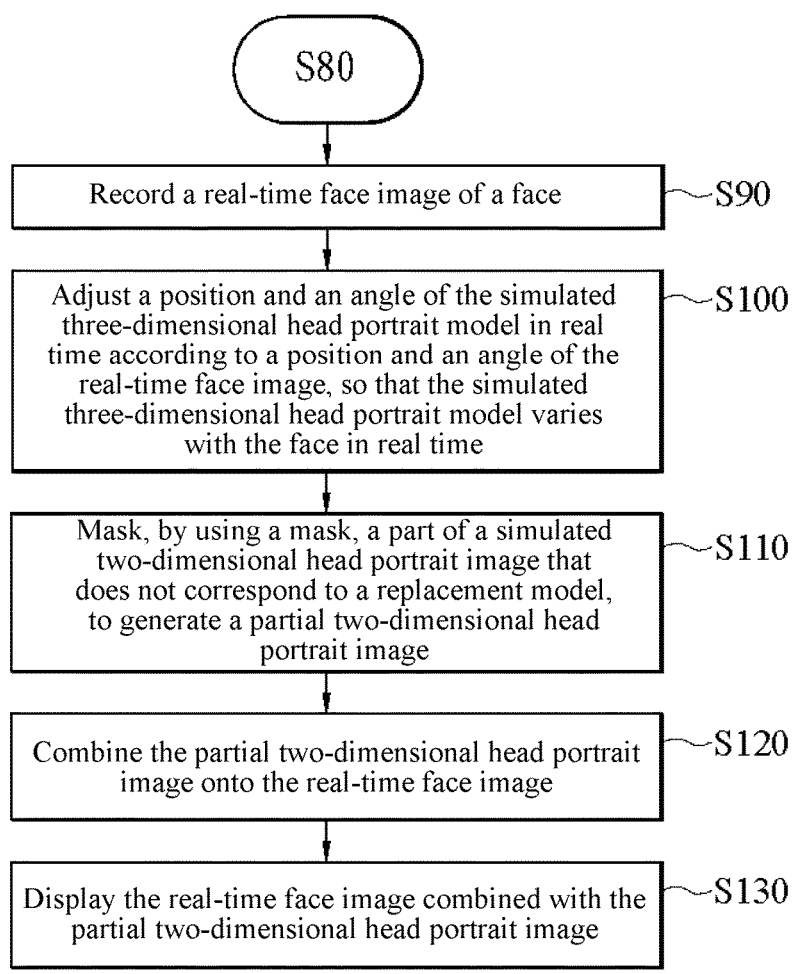
FIG. 21 is a schematic flowchart of another embodiment of a display method.
Figure 22:
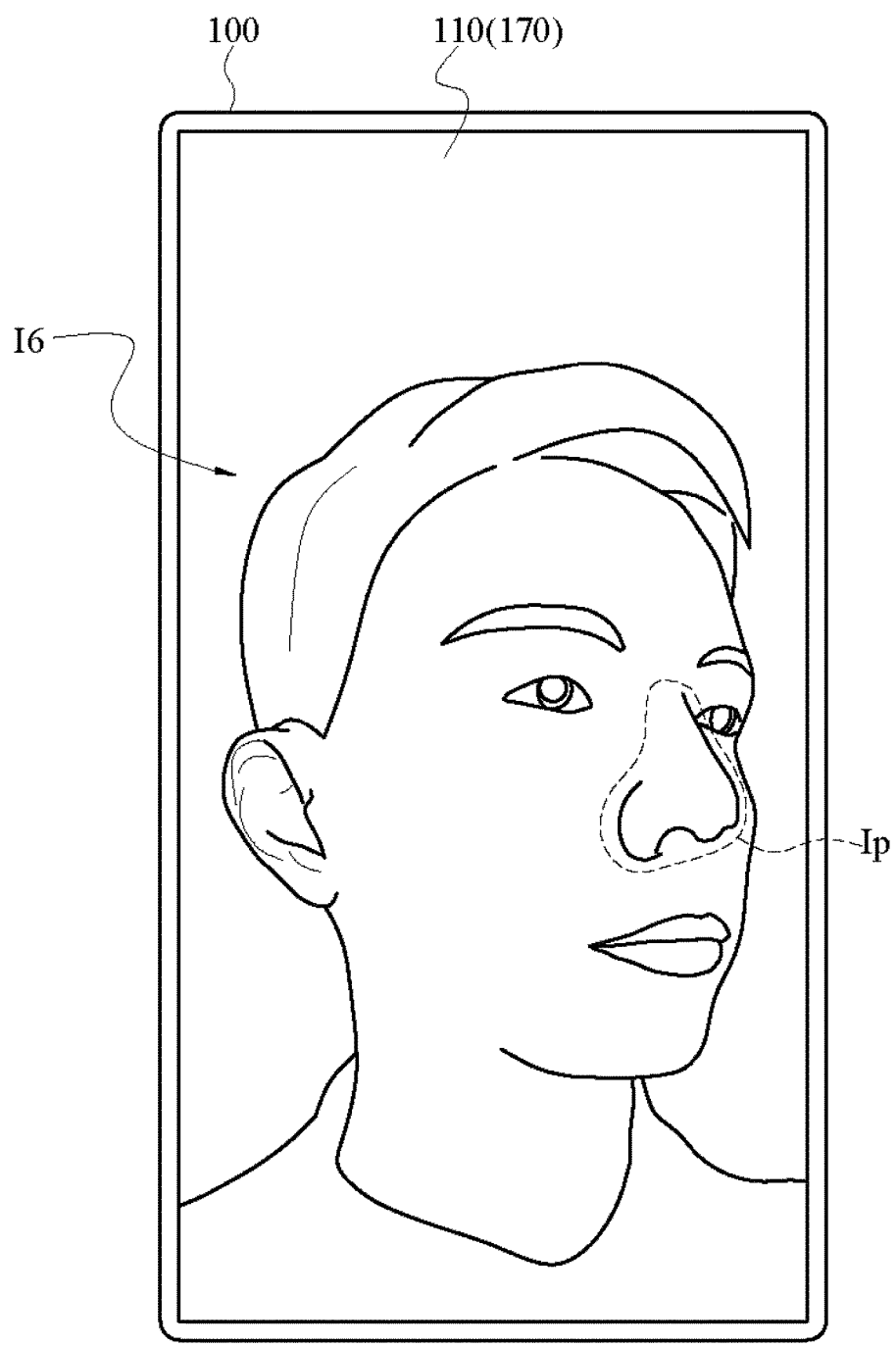
FIG. 22 is a schematic diagram of an embodiment of a real-time face image combined with a partial two-dimensional head portrait image.

Referring to FIG. 3, FIG. 21, and FIG. 22, in another embodiment of the image display method, the processing unit 130 further records a real-time face image I6 of the face U1 of the user in real time by using the image capture unit 120 (step S90). In addition, the processing unit 130 adjusts a position and an angle of the simulated three-dimensional head portrait model M2 in real time according to a position and an angle of the real-time face image I6, so that the simulated three-dimensional head portrait model M2 varies with the face U1 in real time (step S100). When the simulated three-dimensional head portrait model M2 changes the position and/or the angle because the simulated three-dimensional head portrait model M2 varies with the face U1 in real time, the simulated two-dimensional head portrait image I5 displayed by the display unit 110 also changes a display position and/or angle corresponding to the simulated three-dimensional head portrait model M2.

Therefore, when the face U1 of the user moves, turns, or changes a expression, the simulated three-dimensional head portrait model M2 and the simulated two-dimensional head portrait image I5 displayed by the display unit 110 both change correspondingly, so that the user dynamically observes whether a result after simulated replacement meets expectations from different angles according to different facial expressions.

In some embodiments, the processing unit 130 continues to analyze each real-time face image I6, to obtain a plurality of second feature points on the real-time face image I6. In some embodiment aspects, the processing unit 130 performs face recognition and feature point analysis on the real-time face image I6 by using a related face recognition algorithm (in an embodiment, a feature vector algorithm), to obtain the plurality of second feature points. The plurality of second feature points corresponds to the plurality of first feature points P1 on the original three-dimensional head portrait model M1. Therefore, in some embodiments of the step S100, the processing unit 130 adjusts the position and the angle of the simulated three-dimensional head portrait model M2 in real time according to the plurality of second feature points on the real-time face image I6.

In some embodiments, the processing unit 130 masks, by using a mask, a part of the simulated two-dimensional head portrait image I5 that does not correspond to the replacement model M21 on the simulated three-dimensional head portrait model M2, to generate a partial two-dimensional head portrait image Ip (step S110). Later, the processing unit 130 combines the partial two-dimensional head portrait image Ip onto the real-time face image I6 (step S120), and outputs the real-time face image I6 combined with the partial two-dimensional head portrait image Ip to the display unit 110 for displaying (step S130), so that the user directly views the real-time face image I6 having the partial two-dimensional head portrait image Ip on the display unit 110, as shown in FIG. 22. In this way, the user makes any desired expression, and views, by using the display unit 110 like looking into a mirror, whether the appearance of the user after the plastic operation also meets expectations of the user when making the expressions. In addition, when the user performs video communication with others, the user enables the others to see an effect after plastic operation of the user without performing plastic operation indeed.

In some embodiments, the processing unit 130 further establishes a database of the user according to the original three-dimensional head portrait models M1 generated each time when the user uses the electronic device 100, to facilitate the plastic surgeon to perform case tracking according to a plurality of original three-dimensional head portrait models M1 stored in the database.

In some embodiment aspects, the display unit 110 is any suitable display screen, in an embodiment, an LCD screen and an LED screen. The processing unit 130 is implemented by using an SoC chip, a central processing unit (CPU), a microcontroller unit (MCU), or an application-specific integrated circuit (ASIC). In addition, the electronic device 100 is a smartphone, a notebook computer, a tablet computer, or another suitable electronic device.

In some embodiments, the image display method according to any embodiment of the disclosure is implemented by a non-transitory computer readable recording medium. The non-transitory computer readable recording medium stores a plurality of program codes. After the electronic device 100 loads and executes the plurality of program codes, the program codes enable the electronic device 100 to perform the image display method according to any one of the foregoing embodiments. In an embodiment, the non-transitory computer readable recording medium is a storage inside the electronic device 100. In some embodiment aspects, the storage is implemented by using one or more storage components. The storage component is, but not limited to, a nonvolatile memory, in an embodiment, a read-only memory (ROM) or a flash memory, or a volatile memory, in an embodiment, a random access memory (RAM). In another embodiment, the non-transitory computer readable recording medium is a remote storage component, and is transmitted into the electronic device 100 in a wired or wireless manner. In still another embodiment, the non-transitory computer readable recording medium is a storage component outside the electronic device 100, and a program code of the storage component is connected and accessed by using a reader or a connector of the electronic device 100.

In conclusion, in the image display method, the electronic device, and the non-transitory computer readable recording medium in the embodiments of the disclosure, the simulated three-dimensional head portrait model that simulates the appearance of the user after the plastic operation is quickly generated in a modular replacement manner by the replacement model, so that the simulated two-dimensional head portrait image is more quickly provided for the user to refer to the appearance of the user after the plastic operation, and plastic communication and direction setting between the plastic surgeon and the user are accelerated. In addition, in the image display method, the electronic device, and the non-transitory computer readable recording medium in the embodiments of the disclosure, the partial two-dimensional head portrait image of the simulated two-dimensional head portrait image and the real-time face image are displayed in a superimposed manner, so that the user more dynamically observes the appearance of the user after the plastic operation.

The foregoing embodiments and/or embodiments are merely used to describe preferred embodiments and/or embodiments for implementing the technology of the disclosure, rather than limit the embodiments of the technology of the disclosure in any form. Any person skilled in the art may make, without departing from the scope of the technical solutions disclosed by content of the disclosure, some changes or modifications to form other equivalent embodiments. The other equivalent embodiments should be regarded as technologies or embodiments that are substantially the same as the disclosure.

What is claimed is:

1. An image display method, comprising:
    establishing an original three-dimensional head portrait model with a plurality of first feature points according to frontal face information of a face, wherein the frontal face information comprises facial features and depth information of the face, the first feature points form a plurality of first grids on the original three-dimensional head portrait model, and the first feature points define a plurality of facial feature models on the original three-dimensional head portrait model, wherein each of the facial feature models represents one of the facial features of the face;
    establishing a texture mapping figure according to a left face image, a right face image, and the first grids;
    receiving a feature replacement instruction;
    obtaining a replacement model from a plurality of replacement models stored in a replacement model database according to the feature replacement instruction;
    removing a selected feature model from the original three-dimensional head portrait model, wherein the selected feature model is one of the facial feature models which is selected based on the feature replacement instruction;
    combining the replacement model based on an original position of the selected feature model on the original three-dimensional head portrait model to generate a simulated three-dimensional head portrait model;
    generating a simulated two-dimensional head portrait image according to the simulated three-dimensional head portrait model and the texture mapping figure; and
    displaying the simulated two-dimensional head portrait image.

2. The image display method according to claim 1, wherein the step of establishing the texture mapping figure according to a left face image, a right face image, and the first grids further comprises:
    mapping a first part of the first feature points onto the left face image to define a plurality of second grids on the left face image;
    mapping a second part of the first feature points onto the right face image to define a plurality of third grids on the right face image;
    decomposing the left face image into a plurality of second grid images according to the second grids;

decomposing the right face image into a plurality of third grid images according to the third grids;

deforming the second grid images according to the first grids corresponding to the second grids;

deforming the third grid images according to the first grids corresponding to the third grids; and establishing the texture mapping figure according to the deformed second grid images and the deformed third grid images.

3. The image display method according to claim 1, further comprising:

capturing a real-time face image of the face; and adjusting a position and an angle of the simulated three-dimensional head portrait model in real time according to a position and an angle of the real-time face image, so that the simulated three-dimensional head portrait model is changed according to the face in real time.

4. The image display method according to claim 3, wherein the real-time face image comprises a plurality of second feature points, and the step of adjusting a position and an angle of the simulated three-dimensional head portrait model in real time according to a position and an angle of the real-time face image is to adjust the position and the angle of the simulated three-dimensional head portrait model according to the second feature points.

5. The image display method according to claim 3, further comprising:

generating a partial two-dimensional head portrait image by masking a part of the simulated two-dimensional head portrait image that that does not correspond to the replacement model; and combining the partial two-dimensional head portrait image onto the real-time face image; and displaying the real-time face image combined with the partial two-dimensional head portrait image.

6. An electronic device, comprising:

a display unit;

an image capture unit, configured to capture a left face image and a right face image of a face; and a processing unit, configured to execute the following steps:

establishing an original three-dimensional head portrait model with a plurality of first feature points according to frontal face information of a face, wherein the frontal face information comprises facial features and depth information of the face, the first feature points form a plurality of first grids on the original three-dimensional head portrait model, and the first feature points define a plurality of facial feature models on the original three-dimensional head portrait model, wherein each of the facial feature models represents one of the facial features of the face;

establishing a texture mapping figure according to a left face image, a right face image, and the first grids;

receiving a feature replacement instruction;

obtaining a replacement model from a plurality of replacement models stored in a replacement model database according to the feature replacement instruction;

removing a selected feature model from the original three-dimensional head portrait model, wherein the selected feature model is one of the facial feature models which is selected based on the feature replacement instruction;

combining the replacement model based on an original position of the selected feature model on the original three-dimensional head portrait model to generate a simulated three-dimensional head portrait model;

generating a simulated two-dimensional head portrait image according to the simulated three-dimensional head portrait model and the texture mapping figure; and enabling the display unit to display the simulated two-dimensional head portrait image.

7. The electronic device according to claim 6, wherein the processing unit is further configured to execute following steps:

mapping a first part of the first feature points onto the left face image to define a plurality of second grids on the left face image;

mapping a second part of the first feature points onto the right face image to define a plurality of third grids on the right face image;

decomposing the left face image into a plurality of second grid images according to the second grids;

decomposing the right face image into a plurality of third grid images according to the third grids;

deforming the second grid images according to the first grids corresponding to the second grids;

deforming the third grid images according to the first grids corresponding to the third grids; and establishing the texture mapping figure according to the deformed second grid images and the deformed third grid images.

8. The electronic device according to claim 6, wherein the image capture unit captures a real-time face image of the face; and the processing unit further adjusts a position and an angle of the simulated three-dimensional head portrait model in real time according to a position and an angle of the real-time face image, so that the simulated three-dimensional head portrait model is changed according to the face in real time.

9. The electronic device according to claim 8, wherein the real-time face image comprises a plurality of second feature points, and the processing unit adjusts the position and the angle of the simulated three-dimensional head portrait model according to the second feature points.

10. The electronic device according to claim 8, wherein the processing unit is further configured to execute following steps:

generating a partial two-dimensional head portrait image by masking a part of the simulated two-dimensional head portrait image that that does not correspond to the replacement model; and combining the partial two-dimensional head portrait image onto the real-time face image, and enabling the display unit to display the real-time face image combined with the partial two-dimensional head portrait image.

11. A non-transitory computer readable recording medium, storing a plurality of program codes, wherein when the program codes are loaded on an electronic device, the electronic device executes the following steps:

establishing an original three-dimensional head portrait model with a plurality of first feature points according to frontal face information of a face, wherein the frontal face information comprises facial features and depth information of the face, the first feature points form a plurality of first grids on the original three-dimensional head portrait model, and the first feature points define a plurality of facial feature models on the original three-dimensional head portrait model, wherein each of the facial feature models represents one of the facial features of the face;

establishing a texture mapping figure according to a left face image, a right face image, and the first grids;

receiving a feature replacement instruction;

obtaining a replacement model from a plurality of replacement models stored in a replacement model database according to the feature replacement instruction;

removing a selected feature model from the original three-dimensional head portrait model, wherein the selected feature model is one of the facial feature models which is selected based on the feature replacement instruction;

combining the replacement model based on an original position of the selected feature model on the original three-dimensional head portrait model to generate a simulated three-dimensional head portrait model;

generating a simulated two-dimensional head portrait image according to the simulated three-dimensional head portrait model and the texture mapping figure; and displaying the simulated two-dimensional head portrait image.

* * * * *